(12) United States Patent
Komiya

(10) Patent No.: US 7,576,521 B2
(45) Date of Patent: Aug. 18, 2009

(54) SWITCHING REGULATOR

(75) Inventor: Motoki Komiya, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 332 days.

(21) Appl. No.: 11/717,111

(22) Filed: Mar. 13, 2007

(65) Prior Publication Data

US 2007/0216374 A1    Sep. 20, 2007

(30) Foreign Application Priority Data

Mar. 16, 2006  (JP) .............................. 2006-071984

(51) Int. Cl.
    *G05F 1/59* (2006.01)
(52) U.S. Cl. .................. 323/268; 323/272; 323/282
(58) Field of Classification Search ................ 323/265, 323/268, 272, 282, 283, 284, 285, 349, 350, 323/351
    See application file for complete search history.

(56) References Cited

U.S. PATENT DOCUMENTS

| 6,281,666 | B1 * | 8/2001 | Tressler et al. ............... 323/272 |
| 6,674,274 | B2 * | 1/2004 | Hobrecht et al. ............. 323/285 |
| 6,836,417 | B2 * | 12/2004 | Hiraki et al. ................. 323/268 |
| 6,979,985 | B2 * | 12/2005 | Yoshida et al. ............... 323/282 |
| 7,423,415 | B2 * | 9/2008 | Hasegawa et al. ........... 323/282 |
| 2005/0111149 | A1 | 5/2005 | Motomori |
| 2007/0263617 | A1 * | 11/2007 | Takemura .................... 370/360 |
| 2008/0036438 | A1 * | 2/2008 | Komiya ....................... 323/285 |

FOREIGN PATENT DOCUMENTS

| JP | A 06-261536 | 9/1994 |
| JP | A 2004-96826 | 3/2004 |
| JP | A 2004-120901 | 4/2004 |
| JP | A 2004-282835 | 10/2004 |
| JP | A 2004-357388 | 12/2004 |
| JP | A 2005-151606 | 6/2005 |
| JP | A 2005-176587 | 6/2005 |

* cited by examiner

*Primary Examiner*—Adolf Berhane
(74) *Attorney, Agent, or Firm*—Oliff & Berridge, PLC

(57) ABSTRACT

A switching regulator, has first and second switching regulator units, and first and second PLL circuit units that are provided in the first and second switching regulator units respectively, input first and second control pulse signals (PIN1, PIN2) respectively, phases of which are shifted from each other, and control the first timing (T1) of performing non-conduction control on the first switching element (LMOS). The first and second control pulse signals each is controlled to have a frequency corresponding to a voltage-boosted level of the output terminal to maintain the output voltage at predetermined voltage.

10 Claims, 9 Drawing Sheets

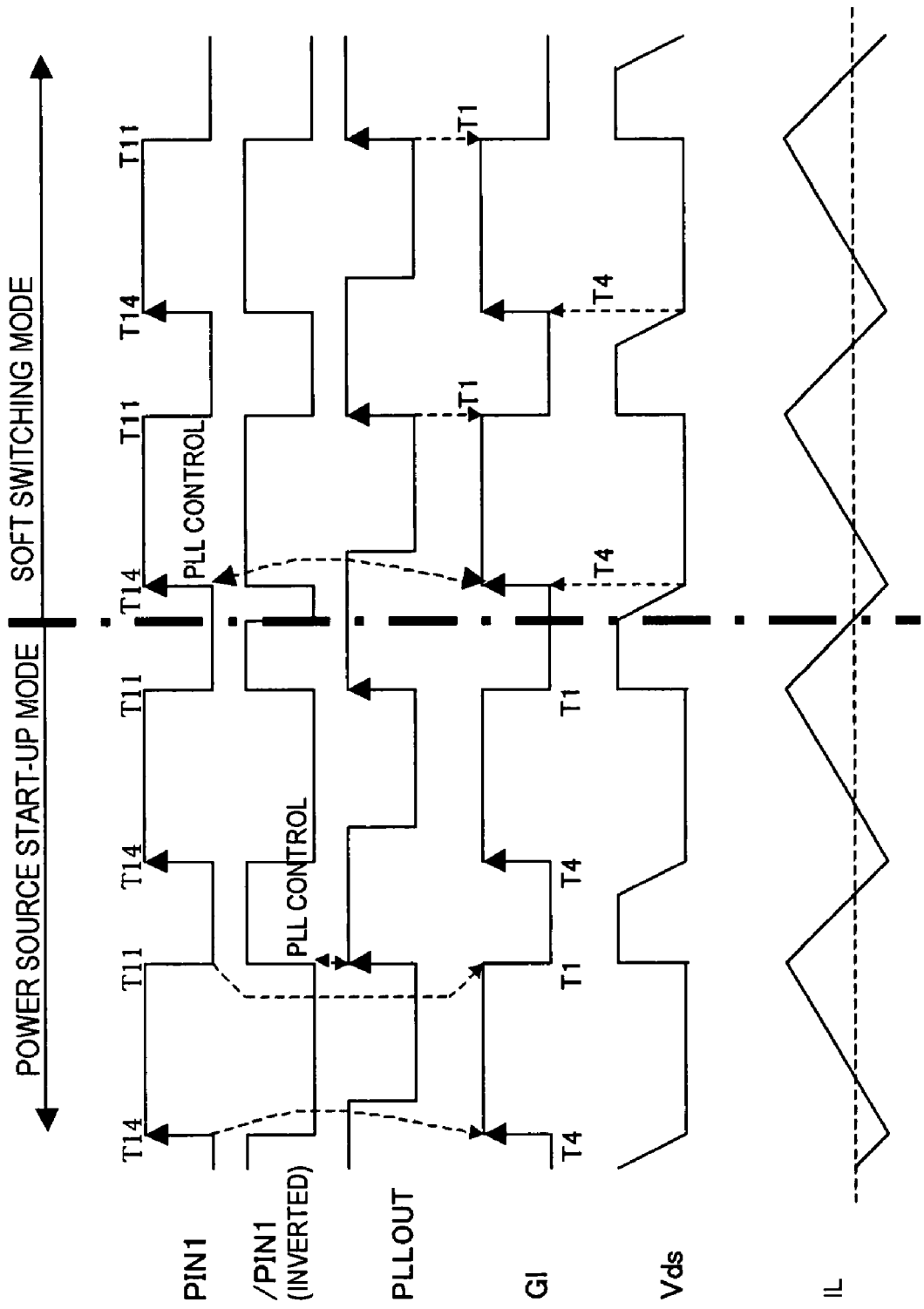

SWITCHING REGULATOR

CROSS-REFERENCE TO RELATED APPLICATIONS

This application is based upon and claims the benefit of priority from the prior Japanese Patent Application No. 2006-071984, filed on Mar. 16, 2006, the entire contents of which are incorporated herein by reference.

BACKGROUND OF THE INVENTION

1. Field of the Invention

The present invention relates to a switching regulator of the natural commutation type, and more particularly relates to a switching regulator having a plurality of switching regulators that are arranged in parallel with one another and operated in parallel.

2. Description of the Related Art

A switching regulator increases or reduces power source voltage to supply the voltage-increased or voltage-reduced power to a load. Such switching regulator connects a coil (inductor) to an input power source voltage, increases the current of the coil to accumulate the energy in the coil, then connects the coil to an output terminal to supply the current by means of the accumulated energy, and generates a voltage-increased power in the output terminal. For example, in an in-car switching regulator, the power source voltage of the battery is increased using the switching regulator, and the voltage-increased power is supplied as drive voltage of a load such as an airbag.

In a conventional switching regulator, with regard to hard switching in which switching operation of a switching element is performed while voltage is supplied or current flows, losses from the switching are significant, necessitating the increase of the size of a heat sink, which blocks the reduction of the size of the heat sink.

However, there is proposed a so-called "switching regulator of the natural commutation type" in order to realize soft switching for causing a switching element to perform switching operation in a state where the voltage or current is zero. Such switching regulator is disclosed in, for example, Japanese Unexamined Patent Application Publication No. 2004-282835.

According to this publication, during a period of time when certain control is performed, a coil is connected between a power source voltage and the ground, the current of the coil is then increased to accumulate the energy in the coil, and thereafter the coil is connected to an output terminal to supply the energy accumulated in the coil to the output terminal. At that moment, although the current flowing in the coil decreases in accordance with an LC constant and thereafter gradually commutates into negative current, the switching element is switching at the time when the current flowing in the coil becomes zero.

In this manner, in the switching regulator of the natural commutation type, the current flowing in the coil increases as positive current and then decreases from the peak current to become negative current. Since the voltage-increased energy is different in accordance with the magnitude of the peak current, the peak current needs to be increased more in order to increase the voltage more. However, if the peak current of the coil is increased, the losses of the coil increase as well, necessitating the increase of the coil size.

Therefore, a plurality of switching regulators are provided in parallel so that higher voltage-boosting operation can be performed without increasing the size of each coil, and so that voltage-boosting operation is performed by shifting phases of the switching regulators, whereby current can be prevented from temporarily flowing into the output terminal in large amounts, and generation of noise can be inhibited.

However, control of the switching element for performing soft switching operation of the natural commutation type is complicated. Particularly, it is not easy to perform switching operation in accordance with the output voltage, while shifting the phases of a plurality of switching regulators that are connected in parallel with one another.

SUMMARY OF THE INVENTION

An object of the present invention is, therefore, to provide a switching regulator having a plurality of switching regulators that are arranged in parallel and are capable of performing switching operation in accordance with an output voltage while performing voltage-boosting operation with shifted phases of the plurality of switching regulators.

In order to achieve the above-described object, according to a first aspect of the present invention, there is provided a switching regulator, having: first and second switching regulator units, each of which has a coil connected to an input power source voltage, a first switching element (LMOS) provided between the coil and a grounded power source, and a second switching element (HMOS) provided between an output terminal and a connection point between the coil and the first switching element, the output terminal being commonly connected, the first switching element (LMOS) being subjected to non-conduction control at a first timing (T1) after starting conduction of the first switching element (LMOS), thereafter the second switching element (HMOS) being subjected to non-conduction control at a second timing (T3) at which current of the coil becomes zero, after starting conduction of the second switching element (HMOS), and thereafter the first switching element (LMOS) being subjected to conduction control at a third timing (T4); and first and second PLL circuit units that are provided in the first and second switching regulator units respectively, input first and second control pulse signals (PIN1, PIN2) respectively, phases of which are shifted from each other, and control the first timing (T1) of performing non-conduction control on the first switching element (LMOS) such that the third timing (T4) synchronizes with the phases of the control pulse signals, wherein the first and second control pulse signals each is controlled to have a frequency corresponding to a voltage-boosted level of the output terminal.

According to a preferred embodiment of the first aspect, the first and second PLL circuit units each has: a PLL circuit that inputs the control pulse signal as a reference pulse, further inputs a signal corresponding to the first timing (T1) as a variable pulse, and generates a PLL output pulse having a frequency corresponding to the phase difference between the reference pulse and the variable pulse; and a flip-flop that is reset by the PLL output pulse and set at the third timing (T4), the first switching element (LMOS) being subjected to switching control by an output signal of the flip-flop, and timing for resetting the flip-flop is the first timing (T1) at which the first switching element (LMOS) is subjected to the non-conduction control, and timing for setting the flip-flop is the third timing (T4) at which the first switching element (LMOS) is subjected to the conduction control.

In the above-described preferred embodiment, the switching regulator further has a buffer circuit for inputting the output signal of the flip-flop to drive a gate terminal of the first switching element (LMOS), wherein a signal of the gate terminal (Gl) of the first switching element (LMOS) is fed back to an input of the PLL circuit as the variable pulse.

In the above-described preferred embodiment, the switching regulator further has a buffer circuit for inputting the output signal of the flip-flop to drive a gate terminal of the first switching element (LMOS), wherein the output signal of the flip-flop is fed back to an input of the PLL circuit as the variable pulse.

In the above-described preferred embodiment, the switching regulator further has a buffer circuit for inputting the output signal of the flip-flop to drive a gate terminal of the first switching element (LMOS), wherein a set signal of the flip-flop is fed back to an input of the PLL circuit as the variable pulse.

In the above-described preferred embodiment, the first and second PLL circuit units further perform switching control so as to drive the gate terminal of the first switching element by means of the first and second control pulse signals during a period of a power source start-up mode for activating the input power source voltage, and to drive the gate terminal of the first switching element by means of the flip-flop output signal during a period of a soft switching mode following the period of the power source start-up mode.

In the above-described preferred embodiment, the first and second PLL circuit units further input the PLL output pulse of the PLL circuit as the variable pulse during a period of a power source start-up mode for activating the input power source voltage, and input the signal corresponding to the first timing as the variable pulse during a period of a soft switching mode following the period of the power source start-up mode.

In the above-described preferred embodiment, the first and second PLL circuit units each synchronizes a phase of a first edge of the signal corresponding to the first timing with a phase of a first edge of the control pulse signal during a period of a soft switching mode following a period of a power source start-up mode for activating the input power source voltage, and each during the period of the power source start-up mode drives the gate terminal of the first switching element by means of the control pulse signal, input an inverted control pulse signal of the control pulse signal as the reference pulse, further input the PLL output pulse of the PLL circuit as the variable pulse, and thereby synchronizes a phase of a first edge of the PLL output pulse with a phase of a second edge of the control pulse signal, and the first and second PLL circuit units each has switching means for switching an operation state between the period of the power source start-up mode and the period of the soft switching mode.

In order to achieve the above-described object, according to a second aspect of the present invention, a switching regulator has: first and second switching regulators which are provided in parallel with each other, outputs of which are commonly connected, and which increase or reduce the voltage of the common output in response to first and second control pulse signals to be supplied respectively; a control circuit that generates first and second basic control pulse signals, phases of which are shifted from each other; and first and second PLL circuit units to which the first and second basic control pulse signals are supplied respectively, and which supply to the first and second switching regulators the first and second control pulse signals, phases of which are synchronized with the phases of the first and second basic control pulse signals respectively, wherein the control circuit monitors the voltage of the common output of the switching regulators, and controls frequencies of the first and second basic control pulse signals in accordance with the monitored voltage while maintaining a phase shifting between the first and second basic control pulse signals.

Since the operation control is performed by means of the control pulse signals in the PLL circuit units, frequencies of the control pulse signals can be variably controlled in response to the output voltage Vout, while operating the plurality of switching regulators by shifting the phases thereof.

BRIEF DESCRIPTION OF THE DRAWINGS

FIG. 8 shows operational waveforms in another modification of the embodiment.

DESCRIPTION OF THE PREFERRED EMBODIMENTS

Embodiments of the present invention will be described hereinafter with reference to the drawings. However, the technical scope of the present invention is not limited to these embodiments but even extends to the matters defined in claims and to the equivalents thereof.

FIG. 1 shows a circuit and operational waveforms of a switching regulator of the natural commutation type. A coil (inductor) L is connected to an input power source Vin (12V, for example), and an N-type MOS transistor LMOS is connected as a first switching element between the coil L and ground. Further, an N-type MOS transistor HMOS is connected as a second switching element between an output terminal Vout and a connection point Vds between the coil L and the transistor LMOS. To the connection point Vds, although a parasitic capacity exists, a capacitor C with a predetermined volume is connected. Furthermore, the output terminal Vout is provided with a smoothing condenser CL.

Figures 1A, 1B:
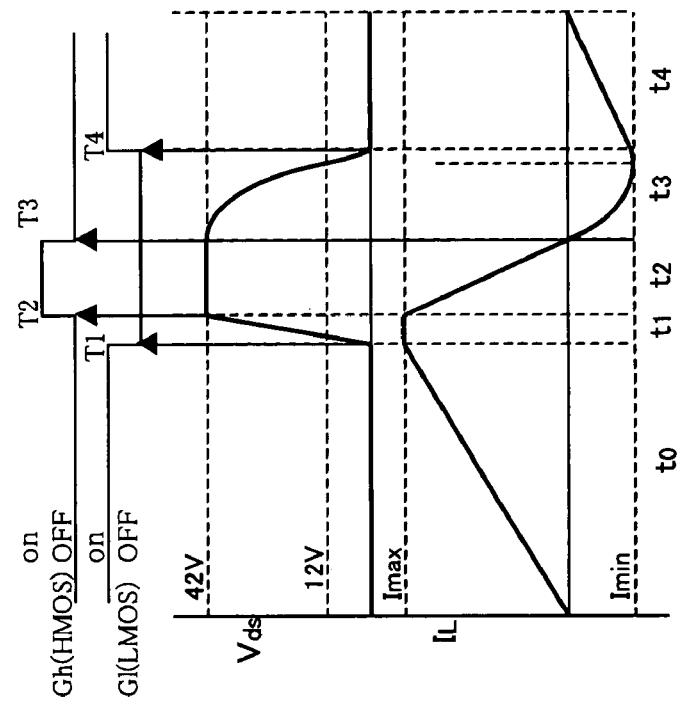
FIG. 1 shows a circuit and operational waveforms of a switching regulator of the natural commutation type.

A control circuit, which is not shown, monitors an output voltage Vout and a voltage of the connection point Vds, and generates gate control signals Gl, Gh for driving gate terminals of the transistors LMOS and HMOS. The operational waveforms shown in FIG. 1B show the gate control signals Gl, Gh, the connection point voltage Vds, and a coil current IL flowing in the coil L. FIG. 1B shows operational waveforms of one cycle, and the operational waveforms are repeated in an actual operation. In this figure, T indicates timing, and t indicates time length.

First of all, the gate control signal Gl becomes H level, whereby the transistor LMOS is conducted (T4), and the coil L is connected between the input power source Vin and ground. As a result, the current IL flowing in the coil L gradually increases against the resistance of the coil L, whereby energy is accumulated In the coil L (period t4+t0). The control circuit controls the conduction period t4+t0 of the transistor LMOS according to the output voltage Vout, and thus controls a timing T1 for non-conducting the transistor LMOS. Specifically, the gate control signal Gl is brought to L level to non-conduct the transistor LMOS at the timing T1. As a result, the connection point voltage Vds increases with the inclination of the capacity of the capacitor C (period t1). The control circuit performs control so as to delay the timing T1 when the output voltage Vout is lower than a specified voltage of, for example, 42V, and performs control so as to set forward the timing T1 when the output voltage Vout is higher than the specified voltage. Accordingly, the conduction period of the transistor LMOS (t4+t0) becomes longer or shorter, the energy to be accumulated in the coil increases or decreases, a peak value Imax of the coil current IL increases or decreases, and the output voltage Vout is controlled to be the specified voltage.

At a timing T2 when a potential of the connection point voltage Vds becomes equal to a potential of the output voltage Vout, the transistor HMOS of the second switching element is conducted. As a result, the energy of the coil L is emitted through the transistor HMOS to the output terminal side, and current is supplied to the output voltage Vout side (period t2). The current IL of the current L decreases at a curve corresponding to a LC constant due to emission of the energy. The control circuit computes a timing T3 at which the coil current IL becomes zero from the timing T2, and brings the gate control signal Gh to the L level to non-conduct the transistor HMOS at the timing T3.

In a period t3 following the timing T3, the coil current IL becomes negative, whereby the current IL flows backward in the coil L, and the connection point voltage Vds starts decreasing. Specifically, electric charges accumulated in the capacitor C are discharged, whereby the voltage Vds decreases. The control circuit monitors the voltage Vds, and brings the gate control signal Gl to the H level at the timing T4 where the voltage Vds becomes zero, to conduct the transistor LMOS. As a result, the coil current IL is reversed and increased to the peak current Imax during the period t4+t0.

By repeating the above-described operation, the output voltage Vout is controlled to be the specified voltage of 42V. Then, by controlling the period t4+t0 at which the transistor LMOS is conducted, the maximum current value Imax of the coil current IL can be controlled, and the energy to be supplied to the output terminal can also be controlled. However, the timings T2, T3 and T4 subsequent to the timing T1 at which the transistor LMOS is turned OFF are each a predetermined timing determined by a circuit constant, the maximum coil current IL, or other condition of the circuit of the moment. These timings can be computed as follows.

After the transistor HMOS is turned OFF when the coil current IL is zero, the coil current IL is a resonance current of an inductance L and the capacitance of the capacitor C, thus the minimum coil current Imin is obtained by:

$Imin=(42V-12V)/\sqrt{(L/C)}$

Also, the period t4 between when the coil current IL is Imin and when the coil current IL becomes 0 is obtained by:

$t4=L*(Imin*0.9165)/12V$

Furthermore, when the coil current IL increases during the period of t0, the peak current Imax is obtained by:

$Imax=12V*t0/L$

The period t1 in which the connection point voltage Vds increases from 0V to 42V is obtained by:

$t1=C*42V/Imax$

Moreover, the period t2 in which the coil current IL becomes 0 from the peak current Imax is obtained by:

$t2=L*Imax/(42V-12V)$

Moreover, the period t3 in which the connection point voltage Vds decreases from 42V to 0V can be detected by monitoring Vds=0.

As described above, the periods t1 through t4 are computed in the above manner, and the period t0 is determined by the control circuit in response to the output voltage Vout. The transistor HMOS is turned OFF at the timing T3 at which IL=0, and the transistor LMOS is turned ON at the timing T4 at which Vds=0, thus losses generated at the time of switching can be inhibited.

[Multi-Switching Regulator]

Next, the switching regulator of the present embodiment is described. The switching regulator shown in FIG. 1 performs soft switching operation by means of positive and negative changes of the coil current IL. Therefore, the peak current Imax needs to be increased in order to raise a voltage-boosted level. However, this increases the losses of the coil, requiring a larger coil. Therefore, in the present embodiment, a plurality of switching regulators are provided in parallel, and operates with phases of these switching regulators being shifted from one another. Accordingly, the size of the coil of each switching regulator can be reduced, and generation of noise at the voltage-boosting of the output voltage Vout can be inhibited.

Figure 2:
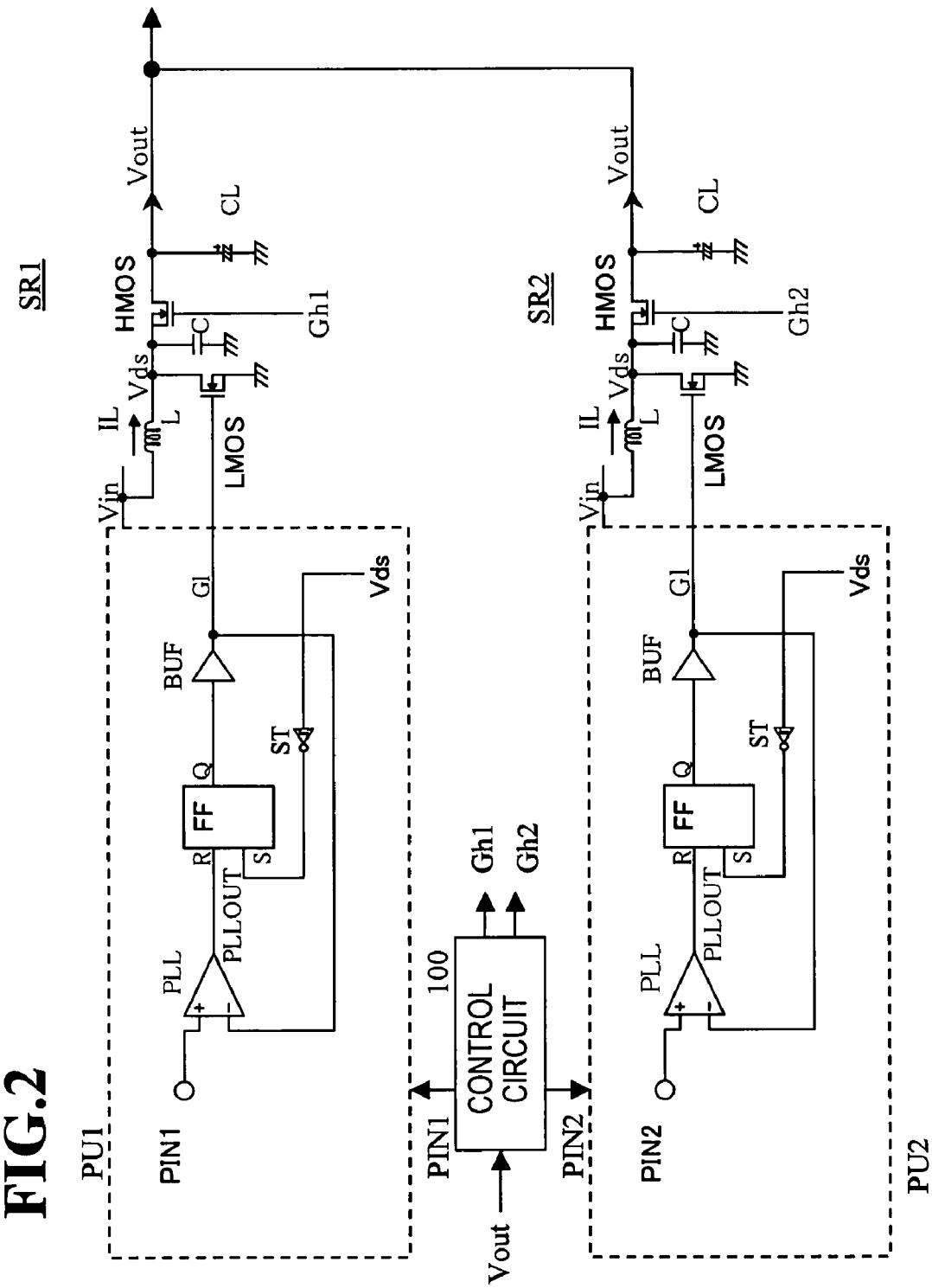
FIG. 2 is a configuration diagram of a multi-switching regulator of an embodiment.

FIG. 2 is a configuration diagram of a multi-switching regulator of the present embodiment. A plurality of, e.g. two, switching regulators SR1 and SR2 are provided in parallel, and outputs thereof are commonly connected to the output terminal Vout. The switching regulators SR1 and SR2 are provided with PLL circuit units PU1 and PU2 respectively. Reference control pulse signals PIN1 and PIN2, phases of which are shifted from each other, are supplied from a control circuit 100 to the PLL circuit units PU1 and PU2 respectively, and the PLL circuit units PU1 and PU2, in synchronized with the phases of the control pulse signals PIN1 and PIN2, control the gate control signal Gl of the transistor LMOS of each of the switching regulators SR1 and SR2.

Specifically, the PLL circuit units PU1 and PU2 control the timing T1 for non-conducting the transistor LMOS in accordance with a phase difference between a rising edge of each of the control pulse signals PIN1 and PIN2 and a rising edge of the gate control signals Gl respectively, and monitors the voltage Vds to control the timing T4 for conducting the transistor LMOS when Vds=0. Accordingly, the two switching regulators SR1 and SR2 perform switching operation in synchronization with the phase of each of the control pulse signals PIN1 and PIN2.

Furthermore, the control circuit 100 monitors the output voltage Vout and performs control to increase the frequencies of the control pulse signals PIN1 and PIN2, so as to reduce the time period for conducting the transistors LMOS to lower pumping energy when the output voltage Vout increases. The control circuit 100 further performs control to reduce the same frequencies, so as to increase the time period for conducting the transistors LMOS to raise the pumping energy when the output voltage Vout decreases. However, by providing the PLL circuit units PU1 and PU2, the voltage-boosting operation of the two switching regulators SR1 and SR2 maintains the relationship in which the phases thereof are shifted from each other by 180 degrees in synchronization with the phases of the control pulse signals PIN1 and PIN2.

Figure 3:
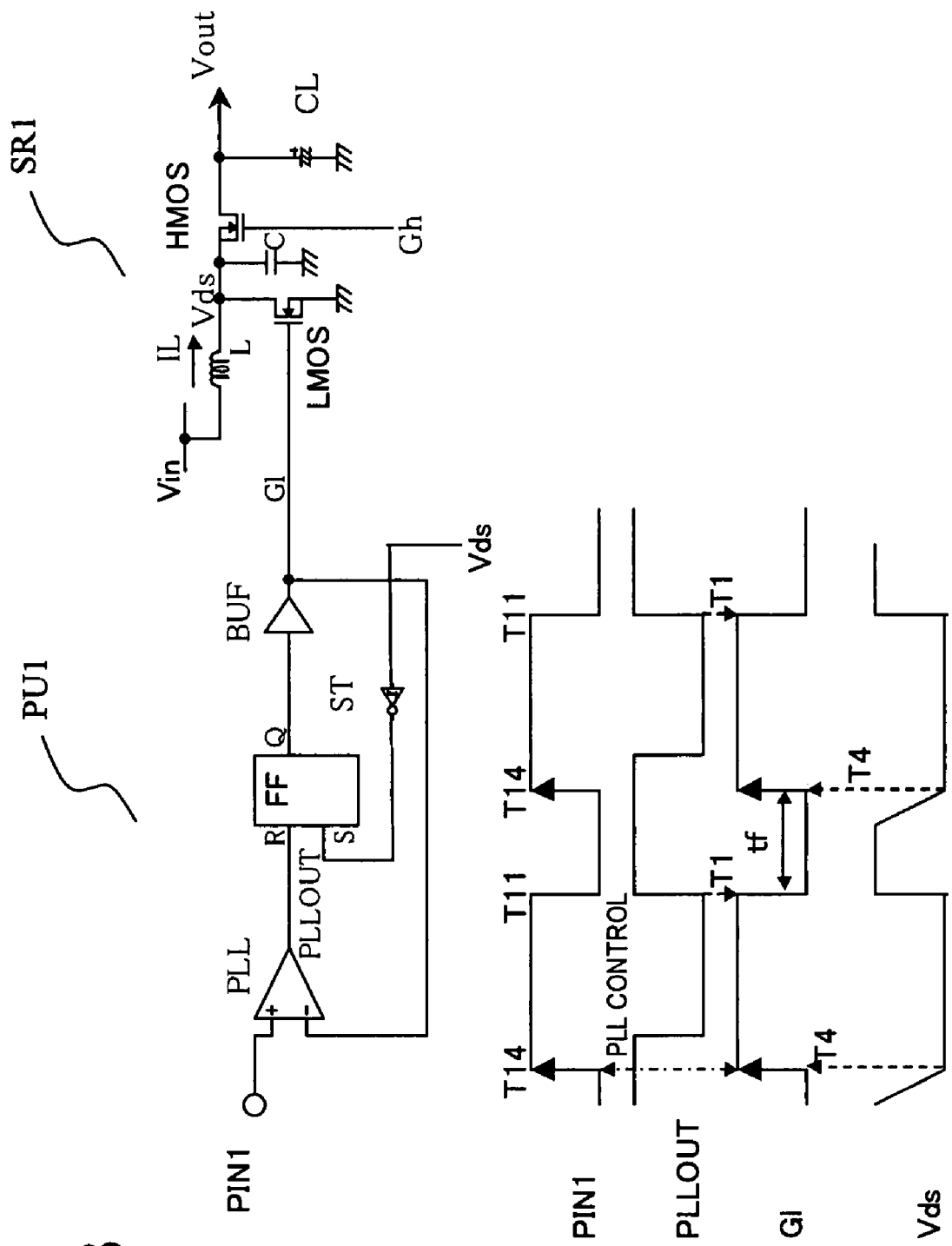
FIG. 3 is a figure for explaining the operation of a PLL circuit unit of the embodiment.

FIG. 3 is a figure for explaining the operation of a PLL circuit unit of the present embodiment. Since the configurations of the PLL circuit units PU1 and PU2 are the same, only the PLL circuit unit PU1 is shown in FIG. 3. The PLL circuit unit PU1 has a PLL circuit PLL, a flip-flop FF, a buffer circuit BUF, and a Schmitt trigger circuit ST. Although not shown, the PLL circuit PU1 also has, as with an ordinary PLL, a phase comparator for comparing phases of the pulses of positive and negative input terminals, a filter circuit for integrating outputs of the phase comparator, and a voltage-controlled oscillator VCO for generating pulses of a frequency corresponding to an obtained integrated voltage value. The flip-flop FF is set such that when a reset terminal R becomes the H level an output Q becomes the L level, and when a set terminal S becomes the H level the output Q becomes the H level.

First of all, in the PLL circuit PLL, the control pulse signal PIN1 is inputted as a reference pulse, the gate control signal Gl is inputted as a variable pulse, to the positive and negative input terminals, and a PLL output PLLOUT of a frequency corresponding to the phase difference between the both signals PIN1 and Gl is outputted. Therefore, PLL control is performed so that the rising edges of the pulse signals PIN1 and Gl become equal to each other.

The PLL output PLLOUT is supplied to the reset terminal of the flip-flop FF, and the output Q is brought to the L level at the rising edge of the PLLOUT. The output Q is supplied to a gate terminal of the transistor LMOS as the gate control signal Gl, via the buffer circuit BUF, and the transistor LMOS is turned OFF at the timing T1 at which the gate control signal Gl becomes the L level.

Then, after a time period tf (=t1+t2+t3) corresponding to the condition of the switching regulator, an output of the Schmitt trigger circuit ST brings the set terminal S to the H level at the timing T4 at which the voltage Vds becomes 0V, in response to which the flip-flop output Q becomes the H level, and the gate control signal Gl also becomes the H level.

In this manner, due to the phase synchronization control performed by the PLL circuit, the PLL output PLLOUT rises in response to the phase difference between the rising edge of the control pulse signal PIN1 and the rising edge of the gate control signal Gl, and the timing T1 for turning OFF the transistor LMOS is controlled. The time period tf from the timing T1 to the timing T4 is determined by the time corresponding to the condition of the circuit. Specifically, the timings T1 and T4 for operating the switching regulator SR1 are controlled in synchronization with the phase of the control pulse signal PIN1.

When the output voltage Vout increases, the control circuit 100 increases the frequency of the control pulse signal PIN1 to cause a timing T14 of the rising edge of the control pulse signal PIN1 to begin early. In response to this, the timing T4 of the rising edge of the gate control signal Gl is delayed, and therefore the PLL circuit performs operation so as to cause the timing T1 of the rising edge of the output PLLOUT to begin early. Accordingly, the timing T1 of a falling edge of the gate control signal Gl starts early, and the timing T4 of the rising edge of the gate control signal Gl subsequent the predetermined time tf also starts early to comply with the phase of the control pulse signal PIN1. When the output voltage Vout decreases, on the other hand, the control circuit 100 reduces the frequency of the control pulse signal PIN1 to delay the timing T14 of the rising edge of the control pulse signal PIN1. In response to this, the timing T4 of the rising edge of the gate control signal Gl starts early, and therefore the PLL circuit performs operation to delay the timing T1 of the rising edge of the output PLLOUT. Accordingly, the timing T1 of the falling edge of the gate control signal Gl is delayed, and the timing T4 of the rising edge of the gate control signal Gl subsequent to the predetermined time tf is also delayed to comply with the phase of the control pulse signal PIN1.

Due to the phase synchronization control performed by the PLL circuit, the switching regulator SR1 operates in accordance with the frequency of the control pulse signal PIN1. Therefore, when the control circuit 100 shown in FIG. 2 controls the frequencies of the control pulse signals PIN1 and PIN2 in response to the output voltage Vout, the two switching regulators SR1 and SR2 operate in response to this control. Thus, the frequencies are controlled while maintaining the phase shifting of 180 degrees between the control pulse signals PIN1 and PIN2, whereby the phases of the two switching regulators SR1 and SR2 are shifted from each other by 180 degrees, and at the same time the voltage-boosting operation can be performed by each switching regulator to maintain the output voltage Vout to the specified voltage of 42V.

It should be noted that the control circuit 100 controls the rising timing T2 and falling timing T3 of gate control signals Gh1 and Gh2 of the respective HMOS transistors on the basis of the computation described above.

Figure 4:
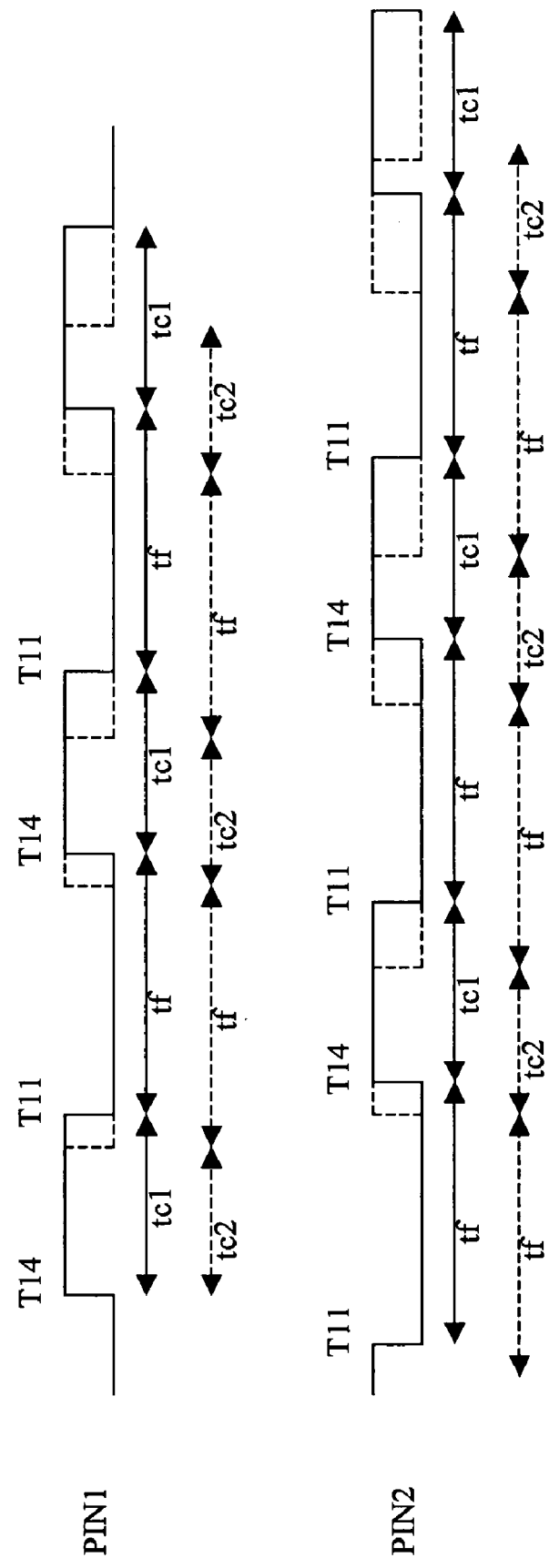
FIG. 4 is a waveform diagram showing changes of control pulse signals.

FIG. 4 is a waveform diagram showing changes of the control pulse signals. The control circuit 100 controls frequencies of the control pulse signals PIN1 and PIN2, and thereby controls the conduction period of the transistors LMOS corresponding to a period tc between the rising edge T14 and a falling edge T11. On the other hand, the time period tf between the falling edge T11 and the rising edge T14 is not controlled, since it is determined by the condition of the circuit as described above. The control pulse signals PIN1, PIN2 change from the state shown by the solid lines to the state shown by the dashed lines when the frequencies are increased, and the timing T14 of the rising edges of the control pulse signals PIN1 and PIN2 starts early. However, the phase shifting of 180 degrees between these control pulse signals is maintained. If, on the other hand, the frequencies are reduced, the control pulse signals change from the state shown by the dashed lines to the state shown by the solid lines, whereby the timing T14 is delayed. In this manner, the control circuit 100 controls the frequencies in accordance with the level of the output voltage Vout, while maintaining the phase relationship between the control pulse signals PIN1 and PIN2.

As described above, according to the present embodiment, operations of the plurality of switching regulators are controlled by the respective control pulse signals by means of the PLL circuit unit, whereby the phase relationship between the operations of the plurality of switching regulators can be caused to correspond to the phase relationship between the control pulse signals, thus a desired relationship between the operations of the plurality of switching regulators can be maintained. Furthermore, the output voltage Vout can be maintained constant by controlling the frequencies of the control pulse signals. Also, even if the peak current Imax of each switching regulator is reduced, at least a certain level of voltage-boosting capability can be obtained by the plurality of switching regulators provided in parallel.

[Modification (Power Source Start-Up Mode)]

In the above embodiment, operations of the plurality of switching regulators are controlled by the PLL circuit units provided in the respective switching regulators. Each of the switching regulators realizes soft switching by controlling the coil current IL to positive and negative values. However, a prerequisite for performing this soft switching operation is that the potential of the output voltage Vout is approximately twice the potential of the input power source voltage Vin. Therefore, when starting up the power source, even though the input power source Vin is 12V, as long as the operation of increasing the output voltage Vout is not complete, the above-mentioned prerequisite of 2Vin<Vout cannot be satisfied. For this reason, during a period of time where the abovementioned prerequisite is not satisfied at the time of power source start-up, the operation control based on the control pulse signals PIN1 and PIN2 cannot be carried out properly by the PLL circuit units. In a modification of the present embodiment, therefore, the operation control performed in a power source start-up mode is different from the operation control performed in a regular soft switching mode.

Figure 5:
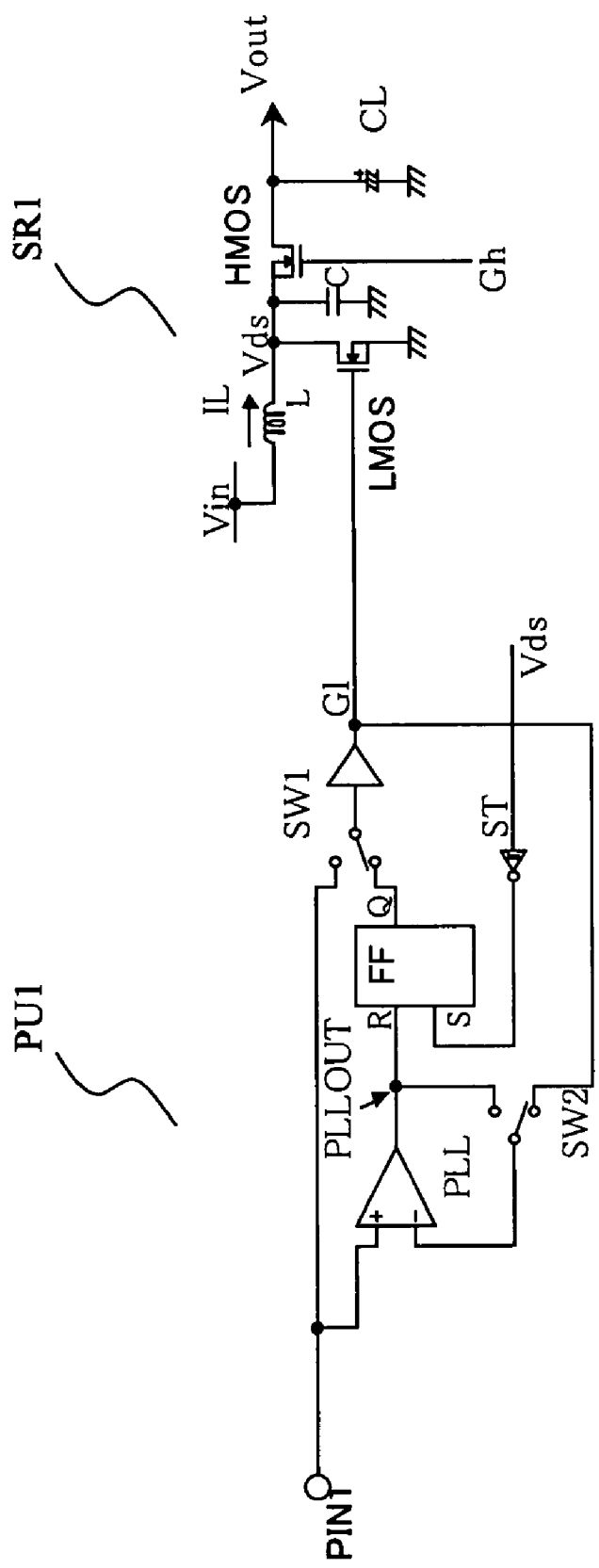
FIG. 5 shows a configuration of the PLL circuit unit in a modification of the embodiment.

FIG. 5 shows a configuration of the PLL circuit unit in the modification of the present embodiment. This PLL circuit unit PU1 additionally has switches SW1 and SW2. In the regular soft switching mode, the switches SW1 and SW2 are controlled in the illustrated directions to realize the operation similar to the one shown in FIG. 3. Also, in the power source start-up mode, the switches SW1 and SW2 are controlled in the directions opposite to the illustrated directions to perform idling operation, which is described hereinafter.

Figure 6:
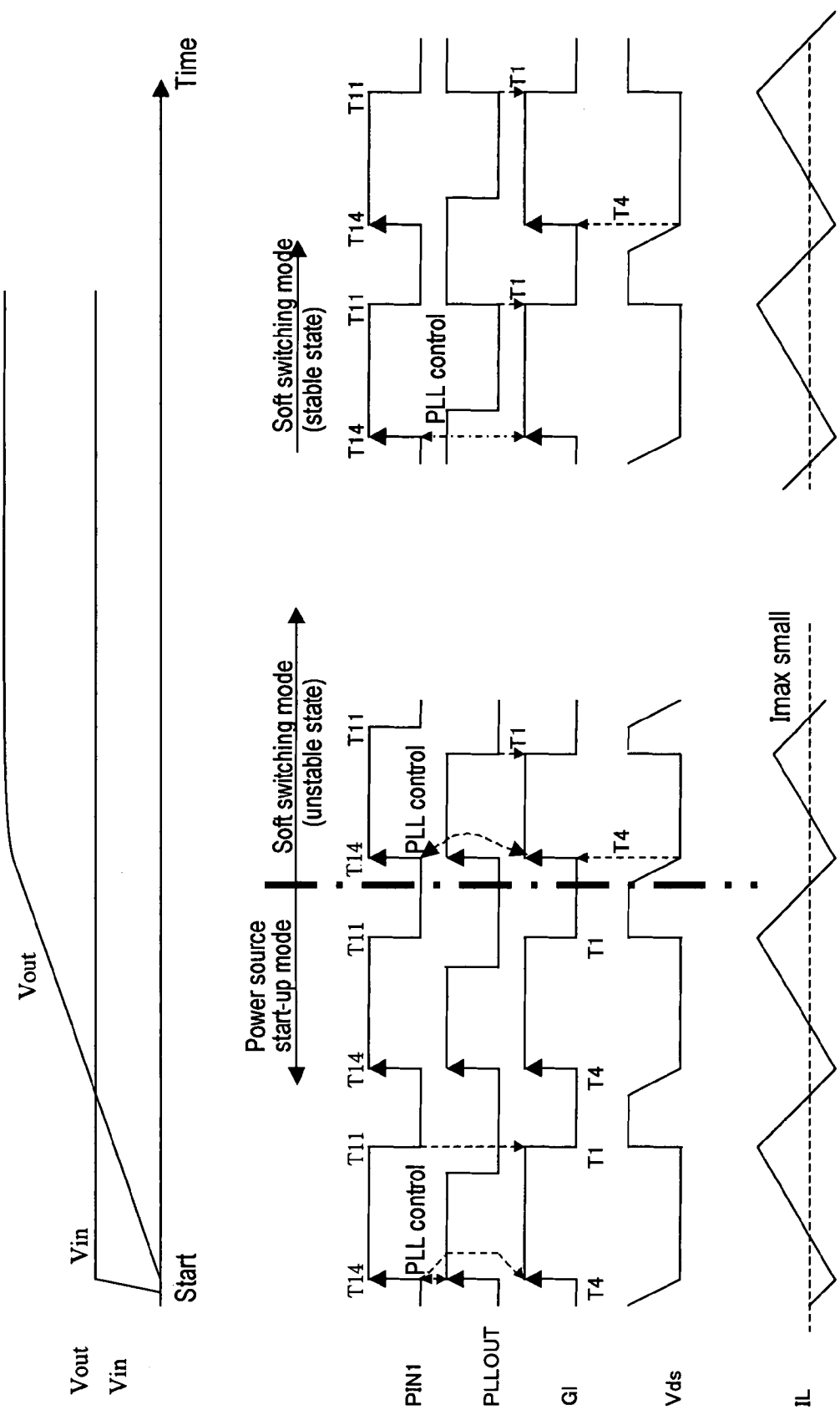
FIG. 6 shows operational waveforms in the modification of the embodiment.

FIG. 6 shows operational waveforms in the modification of the present embodiment. The vertical axis indicates time. When the power source is activated, the input power source voltage Vin rises within a relatively short time, while the output voltage Vout rises gradually. Here, in the power source start-up mode in which the prerequisite of 2Vin<Vout cannot be satisfied, the switches SW1 and SW2 shown in FIG. 5 are controlled in the directions opposite to the illustrated directions. As a result, the gate control signal Gl of the transistor LMOS becomes the same as the control pulse signal PIN1. The timings T4 and T1 at which the transistor LMOS is turned ON and OFF match the rising edge T14 and falling edge T11 of the control pulse signal PIN1.

Moreover, in a feedback loop of the PLL circuit PLL, the PLL circuit output PLLOUT is inputted as the variable pulse directly to the negative input terminal. Therefore, the phase of the rising edge of the control pulse signal PIN1 is synchronized with the phase of the rising edge of the output PLLOUT by the PLL control. In addition, the output PLLOUT becomes a pulse signal with a duty ratio of 50%. In the power source start-up mode, the PLL circuit PLL performs the idling operation and is in a locked state, thus changing modes can be performed more smoothly than a case where the operation of the PLL circuit PLL starts at the soft switching mode.

Next, at the time when the output voltage Vout rises sufficiently and the prerequisite of 2Vin<Vout is satisfied, the power source start-up mode is switched to the soft switching mode, the switches SW1 and SW2 shown in FIG. 5 are controlled in the illustrate directions, and the above-described regular operation is performed. Once the power source start-up mode is switched to the soft switching mode, control is performed such that the phase of the rising edge of the control pulse signal PIN1 is synchronized with the phase of the rising edge of the gate control signal Gl in stead of PLLOUT. With this control, the phase of the output PLLOUT of the PLL circuit is changed due to the phase synchronization control performed by the PLL circuit. Therefore, in the stable state (locked state), the phase of the rising edge of the output PLLOUT is synchronized with the phase of the falling edge of the gate control signal Gl (T1), and the phase of the rising edge of the control pulse signal PIN1 (T14) is synchronized with the phase of the rising edge of the gate control signal Gl (T4).

It should be noted in the circuit configuration shown in FIG. 5 that the PLL circuit enters an unstable state (unlocked state) briefly when the power source start-up mode is changed to the soft switching mode, as shown in FIG. 6. Specifically, once the mode is switched to the soft switching mode, the control pulse signal PIN1 and the gate control signal Gl are subjected to the phase synchronization control by the PLL circuit. Since these signals were the same signals before switching the modes, the first rising edges of these signals are synchronized right after switching the modes. Therefore, in response to this phase synchronization, the output PLLOUT falls at a duty ratio of 50%, in response to which the gate control signal Gl falls (T1). This timing T1 came slightly early, thus the peak current Imax of the coil is insufficient. Furthermore, the rising timing T4 of the gate control signal Gl (not shown) follows the time tf corresponding to the circuit condition, thus the phase of the rising edge of the gate control signal Gl is not synchronized with the phase of the rising edge T14 of the control pulse signal PIN1. Accordingly, the PLL circuit enters the unlocked state.

Due to the phase synchronization operation performed by the PLL circuit over a predetermined period of time, control is performed such that the phase of the output PLLOUT is delayed as shown in the stable state in FIG. 6, the timing T14 of the rising edge of the control pulse signal PIN1 is synchronized with the timing T4 at which the gate control signal Gl rises, and the PLL circuit enters the locked state.

Figure 7:
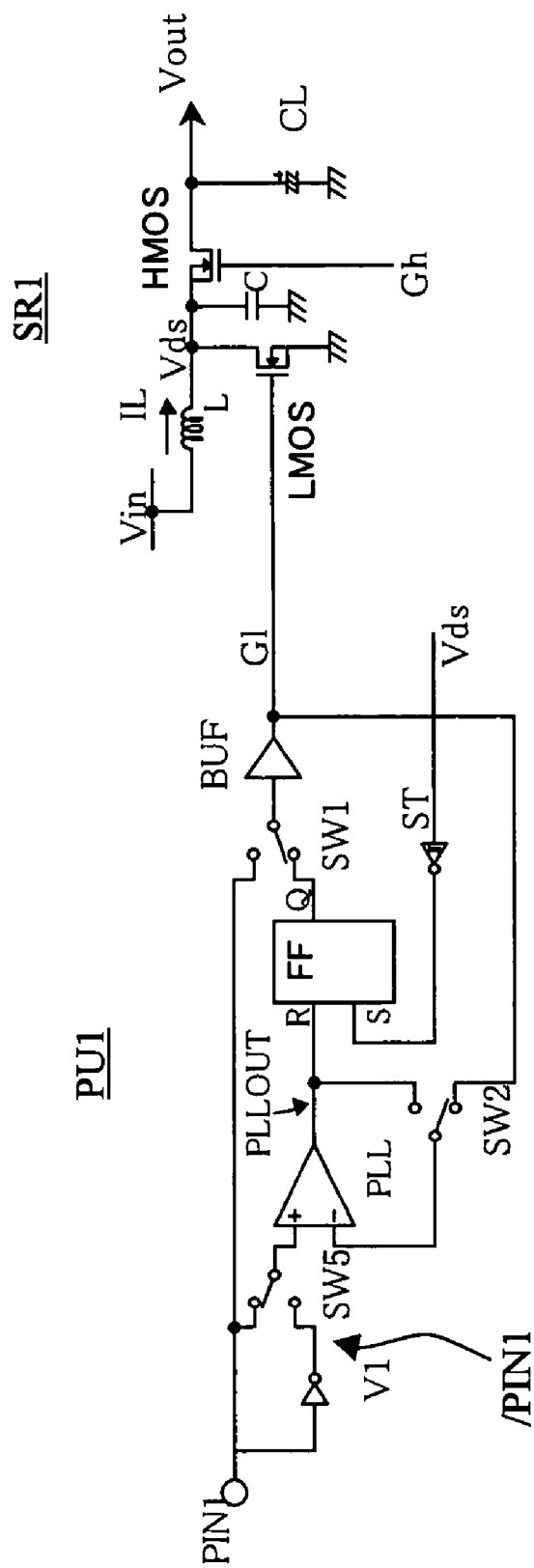
FIG. 7 shows the configuration of the PLL circuit unit in another modification of the embodiment.

FIG. 7 shows the configuration of the PLL circuit unit in another modification of the present embodiment. Also, FIG. 8 shows operational wave forms of the PLL circuit. The PLL circuit unit PU1 shown in FIG. 7 is provided with switches SW1 and SW2 as with the one shown in FIG. 5, as well as an inverter V1 and a switch SW5. In the soft switching mode at the time of normal operation, the switches SW1, 2, 5 are controlled in the illustrated directions, as with the circuit shown in FIG. 3. On the other hand, in the power source start-up mode, the switches SW1, 2, 5 are controlled in the directions opposite to the illustrate directions, and the idling operation is performed.

To describe with reference to the operational waveforms shown in FIG. 8, in the power source start-up mode an inverted signal/PIN1 of the control pulse signal PIN1 is inputted as the reference pulse to the positive input terminal of the PLL circuit PLL, and the output PLLOUT is inputted as the variable pulse directly to the negative input terminal of the same, by the switches SW2 and SW5. Moreover, the control pulse signal PIN1 is supplied as the gate control signal Gl through the switch SW1. Specifically, when the idling operation is performed in the power source start-up mode, the phase of a rising edge of the inverted pulse/PIN1 (T11) is synchronized with the phase of the rising edge of the output PLLOUT, and, since PIN1=Gl stands, both the rising edges of the signals PIN1 and Gl, and the falling edges of the same (T14=T4, T11=T1) are watched respectively. As a result, during the idling operation, the PLL circuit enters the locked state, and the relationship between the synchronized phases of the rising edge of the output PLLOUT and the falling edge of the gate control signal Gl (T1) is maintained.

Here, when the mode is switched to the soft switching mode, the switches SW1, SW2 and SW5 are reversed such that the phase of the rising edge of the control pulse signal PIN1 (T14) is synchronized with the phase of the rising edge of the gate control signal Gl (T4). However, since PIN1=Gl stands in the idling operation, the locked state of the PLL circuit is maintained in the idling operation. Moreover, since the phase of the rising edge of the output PLLOUT was synchronized with the phase of the falling edge of the gate control signal Gl (T1) by the idling operation, the locked state of the PLL circuit is still maintained, in accordance with the condition of phase synchronization, even after switching the modes. Therefore, the PLL circuit is prevented from briefly entering the unlocked state in a short period of time when the modes are switched, which is described with reference to FIG. 6.

[Modification of Feedback Loop]

Figure 9A:
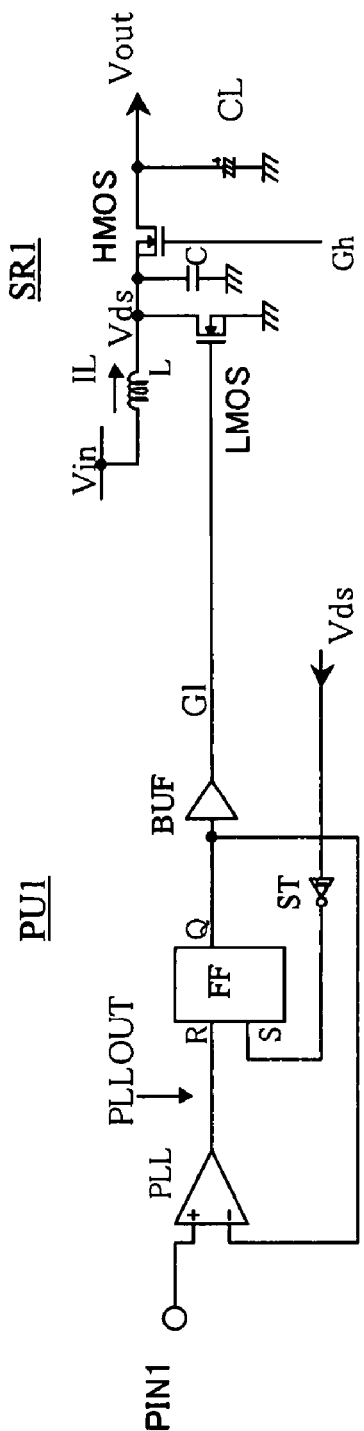
FIG. 9 shows a modification of a feedback loop of the PLL circuit unit of the embodiment.
Figure 9B:
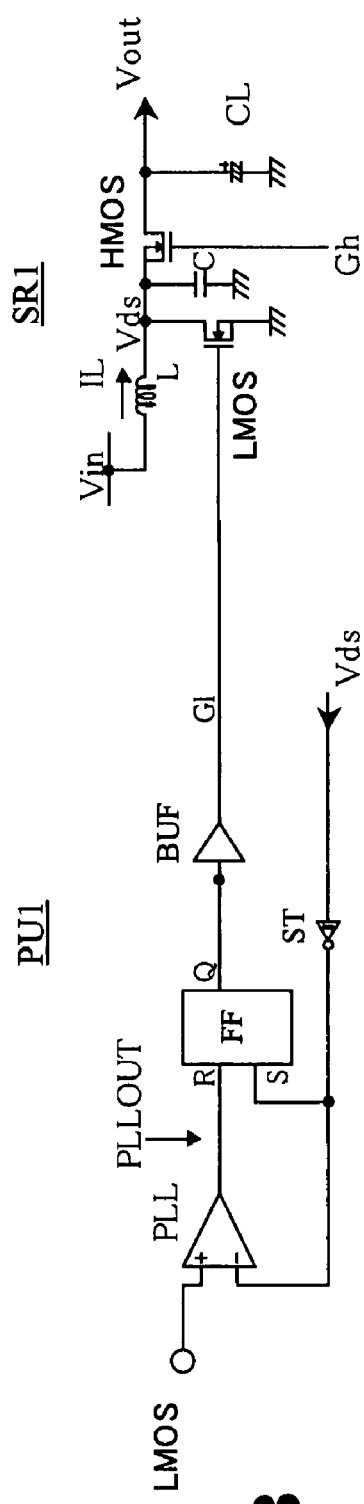

FIG. 9 shows a modification of the feedback loop of the PLL circuit unit of the present embodiment. In FIG. 3, the gate control signal Gl is fed back to the negative input terminal (variable pulse input terminal) of the PLL circuit PLL. However, the phase of the gate control signal Gl is same as the phase of the output Q of the flip-flop FF, and is also same as the phase of an inverted signal of the connection point voltage Vds (set signal S). In the example shown in FIG. 9A, the output Q of the flip-flop FF is fed back to the negative input terminal of the PLL circuit. Moreover, in the example shown in FIG. 9B, the inverted signal of the voltage Vds (set signal S) is fed back to the negative input terminal of the PLL circuit. The same operation can be performed using any of the three feedback loops.

However, it is understood that the jitter of the PLL circuit is small in the example shown in FIG. 9B, compared to the examples shown in FIG. 3 and FIG. 9A. Although the reasons for this are not always clarified, the following assumptions can be considered. Specifically, in the example shown in FIG. 3, a pass for feedback has not only a passage extending from the gate terminal of the transistor LMOS, but also a passage in which ON/OFF control of the transistor LMOS is performed by the gate control signal Gl, the connection point voltage Vds, the phase of which is inverted from the phase of the signal Gl, is generated, and the generated connection point voltage Vds passes through the Schmitt trigger ST, set terminal S, output Q and gate control signal Gl. It can be considered that these two feedback passes increase the jitter.

Similarly, in the example shown in FIG. 9A as well, a pass for feedback has not only a passage extending from the output Q of the flip-flop FF, but also a passage in which ON/OFF control of the transistor LMOS is performed by the gate control signal Gl, the connection point voltage Vds with an inverted phase is generated, and the generated connection point voltage Vds passes through the Schmitt trigger ST, set terminal S, output Q and gate control signal Gl. It can be considered that these two feedback passes increase the jitter.

On the other hand, in FIG. 9B the pass for feedback only has a passage in which ON/OFF control of the transistor LMOS is performed by the gate control signal Gl, the connection point voltage Vds, the phase of which is inverted from the phase of the signal Gl, is generated, and the generated connection point voltage Vds passes through the Schmitt trigger ST, set terminal S, output Q and gate control signal Gl. Therefore, it is considered that the jitter is reduced.

As described above, according to the present embodiment, the operation control is performed by the control pulse signals using the PLL circuit unit, thus variable control of the frequencies of the control pulse signals can be performed in accordance with the output voltage Vout, while operating the plurality of switching regulators having shifted phases.

It should be noted that the above embodiment describes examples of two switching regulators, but three or more switching regulators may be used. In this case as well, the frequencies of the reference control pulse signals PIN are controlled in a state in which the phases thereof are shifted from one another.

Furthermore, the embodiment describes an example of a voltage-boosting circuit in the switching regulator, but even a voltage-reducing circuit can be similarly controlled in synchronization with the reference control pulse signals by means of the PLL circuit unit.

It should be noted that the switching regulator circuit described in the present embodiment can be applied as an in-car controller to a high-speed defrosting device, an electric brake, LED headlight, an electromagnetically-driven valve, a sheet heater, an electric air conditioner, an electric power steering, a motor generator, and the like.

What is claimed is:

1. A switching regulator, comprising:

first and second switching regulator units, each of which has a coil connected to an input power source voltage, a first switching element (LMOS) provided between the coil and a grounded power source, and a second switching element (HMOS) provided between an output terminal and a connection point between the coil and the first switching element, the output terminal being commonly connected, the first switching element (LMOS) being subjected to non-conduction control at a first timing (T1) after starting conduction of the first switching element (LMOS), thereafter the second switching element (HMOS) being subjected to non-conduction control at a second timing (T3) at which current of the coil becomes zero, after starting conduction of the second switching element (HMOS), and thereafter the first switching element (LMOS) being subjected to conduction control at a third timing (T4); and first and second PLL circuit units that are provided in the first and second switching regulator units respectively, input first and second control pulse signals (PIN1, PIN2) respectively, phases of which are shifted from each other, and control the first timing (T1) of performing non-conduction control on the first switching element (LMOS) such that the third timing (T4) synchronizes with the phases of the control pulse signals, wherein the first and second control pulse signals each is controlled to have a frequency corresponding to a voltage-boosted level of the output terminal.

2. The switching regulator according to claim 1, wherein the first and second PLL circuit units each has:

a PLL circuit that inputs the control pulse signal as a reference pulse, further inputs a signal corresponding to the first timing (T1) as a variable pulse, and generates a PLL output pulse having a frequency corresponding to the phase difference between the reference pulse and the variable pulse; and a flip-flop that is reset by the PLL output pulse and set at the third timing (T4), the first switching element (LMOS) being subjected to switching control by an output signal of the flip-flop, and timing for resetting the flip-flop is the first timing (T1) at which the first switching element (LMOS) is subjected to the non-conduction control, and timing for setting the flip-flop is the third timing (T4) at which the first switching element (LMOS) is subjected to the conduction control.

3. The switching regulator according to claim 2, further comprising a buffer circuit for inputting the output signal of the flip-flop to drive a gate terminal of the first switching element (LMOS), wherein a signal of the gate terminal (Gl) of the first switching element (LMOS) is fed back to an input of the PLL circuit as the variable pulse.

4. The switching regulator according to claim 2, further comprising a buffer circuit for inputting the output signal of the flip-flop to drive a gate terminal of the first switching element (LMOS), wherein the output signal of the flip-flop is fed back to an input of the PLL circuit as the variable pulse.

5. The switching regulator according to claim 2, further comprising a buffer circuit for inputting the output signal of the flip-flop to drive a gate terminal of the first switching element (LMOS), wherein a set signal of the flip-flop is fed back to an input of the PLL circuit as the variable pulse.

6. The switching regulator according to claim 2, wherein the first and second PLL circuit units further perform switching control so as to drive the gate terminal of the first switching element by means of the first and second control pulse signals during a period of a power source start-up mode for activating the input power source voltage, and to drive the gate terminal of the first switching element by means of the flip-flop output signal during a period of a soft switching mode following the period of the power source start-up mode.

7. The switching regulator according to claim 2, wherein the first and second PLL circuit units further input the PLL output pulse of the PLL circuit as the variable pulse during a period of a power source start-up mode for activating the input power source voltage, and input the signal corresponding to the first timing as the variable pulse during a period of a soft switching mode following the period of the power source start-up mode.

8. The switching regulator according to claim 2,
wherein the first and second PLL circuit units each synchronizes a phase of a first edge of the signal corresponding to the first timing with a phase of a first edge of the control pulse signal during a period of a soft switching mode following a period of a power source start-up mode for activating the input power source voltage, and each during the period of the power source start-up mode drives the gate terminal of the first switching element by means of the control pulse signal, input an inverted control pulse signal of the control pulse signal as the reference pulse, further input the PLL output pulse of the PLL circuit as the variable pulse, and thereby synchronizes a phase of a first edge of the PLL output pulse with a phase of a second edge of the control pulse signal, wherein the first and second PLL circuit units each has a switching unit that switches an operation state between the period of the power source start-up mode and the period of the soft switching mode.

9. A switching regulator, comprising:
first and second switching regulators which are provided in parallel with each other, outputs of which are commonly connected, and which increase or reduce the voltage of the common output in response to first and second control pulse signals to be supplied respectively;
a control circuit that generates first and second reference control pulse signals, phases of which are shifted from each other; and
first and second PLL circuit units to which the first and second reference control pulse signals are supplied respectively, and which supply to the first and second switching regulators the first and second control pulse signals, phases of which are synchronized with the phases of the first and second reference control pulse signals respectively,
wherein the control circuit monitors the voltage of the common output of the switching regulators, and controls frequencies of the first and second reference control pulse signals in accordance with the monitored voltage while maintaining a phase shifting between the first and second reference control pulse signals.

10. A switching regulator, comprising:
a plurality of switching regulator units which are provided in parallel with each other, outputs of which are commonly connected to an external circuit, and which increase the voltage of the common output in response to a switching control pulse signal to be supplied; and
a plurality of phase control circuits to which are supplied a plurality of reference control pulse signals, the phases of which are shifted from one another, and which supply to the plurality of switching regulator units switching control pulse signals, phases of which are synchronized with the phases of the reference control pulse signals respectively,
wherein frequencies of the plurality of reference control pulse signals are controlled in accordance with the voltage of the common output of the switching regulator units, while maintaining phase shifting among the reference control pulse signals, and
the switching regulator units each has: a coil for accumulating energy of power source voltage; a first switching section that is connected to an end of the coil and is conducted when accumulating the energy in the coil; and a second switching section that is provided between the coil and the common output, conducted after the energy is accumulated in the coil, and non-conducted when current of the coil becomes zero, the first switching section being non-conducted in response to the switching control pulse signals respectively.

* * * * *